US009330291B2

United States Patent
Tao et al.

(10) Patent No.: US 9,330,291 B2
(45) Date of Patent: May 3, 2016

(54) METHOD AND DEVICE FOR PARSING IMAGES (71) Applicant: TENCENT TECHNOLOGY (SHENZHEN) COMPANY LIMITED, Shenzhen (CN)

(72) Inventors: Yong Tao, Shenzhen (CN); Sha Mo, Shenzhen (CN); Hao Tang, Shenzhen (CN); Ning Ma, Shenzhen (CN); Zhou Feng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/713,113

(22) Filed: May 15, 2015

(65) Prior Publication Data

US 2015/0248571 A1 Sep. 3, 2015

Related U.S. Application Data (63) Continuation of application No. PCT/CN2013/086534, filed on Nov. 5, 2013.

(30) Foreign Application Priority Data

Nov. 22, 2012 (CN) .......................... 2012 1 0477245

(51) Int. Cl.
*G06K 7/14* (2006.01)
*G06F 3/0482* (2013.01)
*G06F 3/0484* (2013.01)

(52) U.S. Cl.
CPC ............ *G06K 7/1417* (2013.01); *G06F 3/0482* (2013.01); *G06F 3/04845* (2013.01); *G06K 7/1443* (2013.01); *G06K 7/1447* (2013.01); *G06K 7/1478* (2013.01)

(58) Field of Classification Search
CPC ...................... G06F 17/30879; G06Q 20/3276
USPC .................................................. 235/375, 454
See application file for complete search history.

(56) References Cited

U.S. PATENT DOCUMENTS

2006/0118632 A1 6/2006 Joseph et al.
2009/0184171 A1 7/2009 Lv et al.
(Continued)

FOREIGN PATENT DOCUMENTS

| CN | 102034127 A | 4/2011 |
| CN | 102184378 A | 9/2011 |
| CN | 102609544 A | 7/2012 |

(Continued)

OTHER PUBLICATIONS

Search Report in International Application No. PCT/CN2013/086534 dated Feb. 20, 2014.
(Continued)

*Primary Examiner* — Jamara Franklin
(74) *Attorney, Agent, or Firm* — Marshall, Gerstein & Borun LLP (57) ABSTRACT

According to an example, a method for parsing an image may be provided. An image on a device may be processed by the device. Key characteristics of the image may be obtained by the device. The image may be parsed by the device with a two-dimension decoding mode. Content information of the image may be obtained by the device.

15 Claims, 7 Drawing Sheets

(56) References Cited

U.S. PATENT DOCUMENTS

2014/0197232 A1* 7/2014 Birkler .................. G06F 21/313
                                                        235/375
2015/0001287 A1   1/2015 Zhong et al.

FOREIGN PATENT DOCUMENTS

CN         102638724 A    8/2012
JP         4846945 B2    12/2011

OTHER PUBLICATIONS

Office Action in CN Application No. 201210477245.4 dated Feb. 16, 2015, 8 pages.
International Preliminary Report on Patentability and Written Opinion in International Application No. PCT/CN2013/086534 dated Jun. 4, 2015, 7 pages.

* cited by examiner

METHOD AND DEVICE FOR PARSING IMAGES

This application is a continuation of International Application No. PCT/CN2013/086534, filed on Nov. 5, 2013, which claims priority to Chinese patent application No. 201210477245.4, filed on Nov. 22, 2012, the content of which are incorporated herein by reference in their entirety.

FIELD OF THE INVENTION

The present disclosure relates to an image processing technology field, and more particularly to a method and device for parsing an image.

BACKGROUND

A two-dimension code may be also called two-dimension bar code. The two-dimension code may include a bar-and-space figure formed by distributing a specific geometry in a two-dimension direction according to certain rules and may be used for recording data and symbols, etc. The two-dimension code may have many advantages, such as, large capacity of information, wide range of application, high decoding reliability, low costs and easy to make and the two-dimension code may be widely used.

SUMMARY

Examples of the present disclosure may provide a method and a device for parsing an image, which may parse the image in the device without help of other devices, reduce unnecessary parsing processing, enhance parsing efficiency and save resources.

An example of the present disclosure may provide a method for parsing an image, including:
  processing, by a device, an image on the device;
  obtaining, by the device, key characteristics of the image;
  parsing, by the device, the image with a two-dimension decoding mode; and
  obtaining, by the device, content information of the image.

Another example of the present disclosure may provide a device for parsing an image, including:
  a processing module, to process an image on the device and obtain key characteristics of the image; and
  a parsing module, to parse the image with a two-dimension decoding mode and obtain content information of the image.

Another example of the present disclosure may provide non-transitory computer-readable medium storing instructions which, when executed by one or more processors, cause a device to perform a method for parsing an image, comprising:
  processing, by a device, an image on the device;
  obtaining, by the device, key characteristics of the image;
  parsing, by the device, the image with a two-dimension decoding mode; and
  obtaining, by the device, content information of the image.

With the examples of the present disclosure, this example of the present disclosure may parse the image on this device (i.e. the image on the device performing the parsing process) without help of other devices, which may enhance the parsing efficiency. Before the image is parsed, this example of the present disclosure may first determine whether the image includes the two-dimension code and parse the image with the two-dimension decoding mode if it may be determined that the image includes the two-dimension code, which may reduce unnecessary process, enhance the parsing efficiency and save the resources.

BRIEF DESCRIPTION OF THE DRAWINGS

In order to clearly describe the technical scheme in the present disclosure, a brief description is given to accompanying figures used in following examples. Obviously, the accompanying figures described hereinafter are some examples in the present disclosure. An ordinary skilled in the art may obtain other figures with these accompanying figures without creative work.

DETAILED DESCRIPTION

For simplicity and illustrative purposes, the present disclosure is described by referring mainly to example(s) thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

According to an example, a process for parsing an image including a two-dimension code may include: scanning the two-dimension code in an image including the two-dimension code with a device with an image acquisition function, such as a mobile phone and PAD with a camera, parsing the two-dimension code obtained with a two-dimensional decoding mode and obtaining content information stored in the two-dimension code. In the above parsing scheme, since the device may only scan the two-dimension code on other devices, if there may be an image needed to be parsed in the device, other devices may be needed to scan and parse the image. This tedious operation mode affects the decoding efficiency of the image.

According to an example of the present disclosure, the device for parsing the image may be a device, such as a browser and IM software. The device for parsing an image may be a terminal device, may include but not be limited to a PC, a tablet PC, a mobile phone, an intelligent phone, an electric reader and a laptop, etc. This end may refer to the device for executing the method for parsing the image in this example of the present disclosure. The image of this end may refer to the image on this device. The image may include but may not be limited to an image on a current webpage, an image stored in the device or an image in a file displayed on the device. In this example of the present disclosure, the two-dimension code may include a Multi-row two-dimension code or a matrix two-dimension code. The Multi-row code may also be called a stacked two-dimension code or a Multi-layer two-dimension code. The Multi-row two-dimension code may include but not be limited to a Portable Data File (PDF), a 417 code, a CODE49 code and a CODE 16K code. The matrix two-dimension code may also be called a checkerboard two-dimension code. The matrix two-dimension code may include but not be limited to a Quick Response (QR) code, Maxi code and Data Matrix code.

The method for parsing an image provided by an example of the present disclosure may be described hereinafter in detail accompanying with FIGS. 1 to 3.

Figure 1:
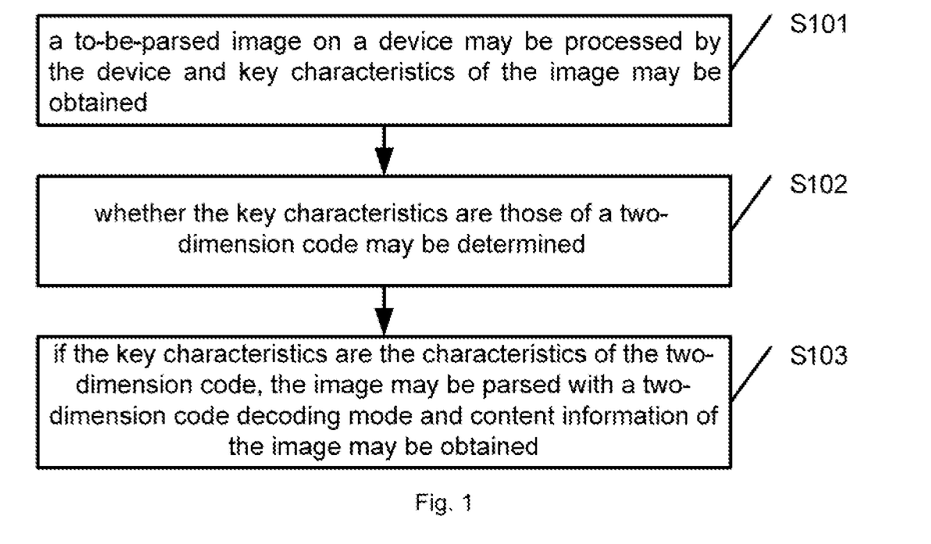
FIG. 1 is a flow chart illustrating a method for parsing an image in accordance with an example of the present disclosure.

Referring to FIG. 1, FIG. 1 is a flow chart illustrating a method for parsing an image in accordance with an example of the present disclosure. The method may include blocks S101 to S103.

In block S101, a to-be-parsed image on a device may be processed by the device and key characteristics of the image may be obtained.

The image may include the image on a current webpage displayed on this end, an image stored in this end or an image in a file displayed on this end. For the convenience of parsing the image, the processing of the image may include performing binary processing on the image, converting the image into a Grayscale image and extracting the key characteristics.

In block S102, whether the key characteristics are those of a two-dimension code may be determined.

The two-dimension may include positioning images. The positioning images may be foundation of identification of the two-dimension code. An area of the two-dimension code may be determined according to the positioning images. In this example, the positioning images of the two-dimension may be taken as significant character points of the two-dimension code. The extracted key characteristics of the image may be compared with those of the two-dimension code. If the key characteristics of the image are determined as the characteristics of the two-dimension code, the image may include the two-dimension code. If the key characteristics of the image are not the characteristics of the two-dimension code, the image may not include the two-dimension code. In this block, before the image is parsed, the determination of whether the image is the two-dimension code may be performed, which may reduce unnecessary parsing process and reduce the costs of the resources.

According to an example, the block S102 may be optional.

In block S103, if the key characteristics are the characteristics of the two-dimension code, the image may be parsed with a two-dimension code decoding mode and content information of the image may be obtained.

If the key characteristics of the image are those of the two-dimension code, it may show that the image may be a two-dimension code or an image including the two-dimension code. The two-dimension code in the image may be read and parsed. Therefore, the content information stored in the two-dimension code may be obtained.

According to an example, if the block S102 is not included, in this block S103, the image may be directly parsed with the two-dimension decoding mode after the key characteristics of the image may be obtained.

According to the above description of the above example, this example of the present disclosure may parse the image of this end (i.e. the image in the device performing the parsing process) without help of other devices, which may enhance the parsing efficiency. Before the image is parsed, this example of the present disclosure may first determine whether the image includes the two-dimension code and parses the image with the two-dimension decoding mode if it may be determined that the image include the two-dimension code, which may reduce unnecessary process, enhance the parsing efficiency and save the resources.

Figure 2:
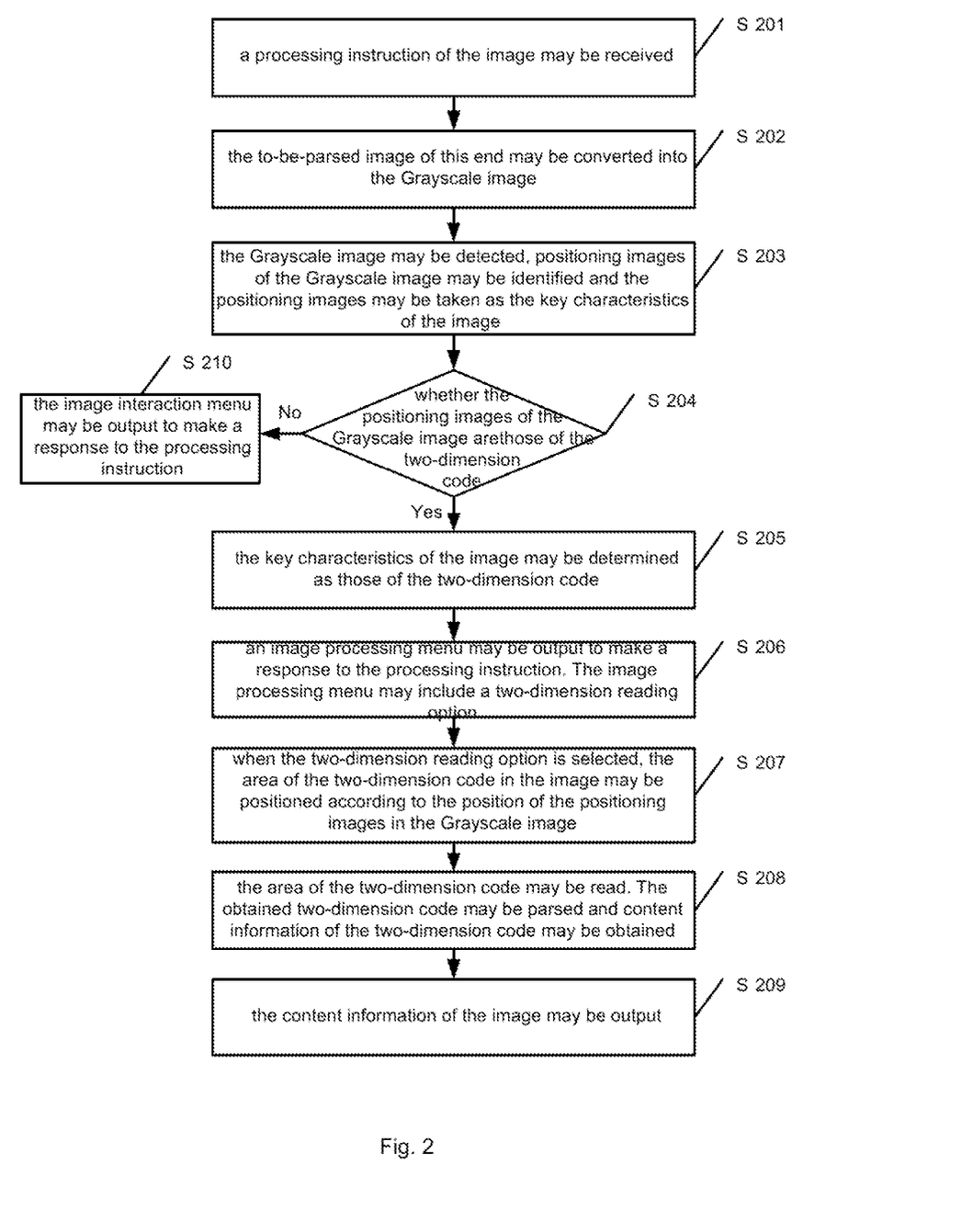
FIG. 2 is a flow chart illustrating another method for parsing an image in accordance with an example of the present disclosure.

Referring FIG. 2, FIG. 2 is another method for parsing an image in accordance with an example of the present disclosure. The method may include the following blocks S201 to S210.

In block S201, a processing instruction of the image may be received.

The processing instruction may include an instruction generated by clicking on the image, an instruction generated by pressing the image exceeding a preset length of time or an instruction generated by a selection menu. The preset length of time may be set as needed, such as may be set as 1 second or two seconds. For example, when a user views an image on a webpage with a mobile phone, the processing instruction may be generated by clicking on the image on the webpage. The processing instruction may also be generated by pressing the image on the webpage exceeding 1 second. In the alternative, the processing instruction may be generated by clicking on a selection menu in the mobile phone. In this block, the processing instruction may be received and the subsequent flow for processing the image may be triggered.

In block S202, the to-be-parsed image of this end may be converted into the Grayscale image.

Under the trigger of the processing instruction, the image may be processed in this block and the image may be converted into the Grayscale image. The process may include: reading Red Green Blue (RGB) values of pixels of the image, saving the RGB values of the pixels of the image in a binary array and converting the RGB values in the binary array into YUV ("Y" represents Luminance. "U" and "V" represent Chrominance) values with a YUV algorithm. With the above processing method, the image may be converted into the Grayscale image and the binary processing may be performed on the image. The pixels of the image may be saved in the binary array. The processing in this block is beneficial to determine whether the image includes the two-dimension code and parse the image.

In block S203, the Grayscale image may be detected, positioning images of the Grayscale image may be identified and the positioning images may be taken as the key characteristics of the image.

The two-dimension code may include the positioning images. The positioning images may be the foundation of the identification of the two-dimension code. An area of the two-dimension code may be determined with the positioning images. As for different two-dimension codes, the positioning images may be different. For instance, the positioning images of a QR code may be three square images respectively located at the upper left corner, lower left corner and lower right corner of the QR code. The positioning images of the Maxi code may be an image located at the core of the two-dimension code and formed by three evenly spaced concentric circles. The positioning images of the Data Matrix code may be two vertical line segments respectively located at the left and bottom of the two-dimension code. Since the positioning images may be the distinguishing features of the two-dimension code, the Grayscale image obtained by converting the to-be-parsed image may be detected in this block according to the detection method of the positioning images of the two-dimension code, the positioning images of the Grayscale image may be identified and the positioning images may be taken as the key characteristics of the image.

In block S204, whether the positioning images of the Grayscale image are the positioning images of the two-dimension code may be determined. If the positioning images of the Grayscale image are the positioning images of the two-dimension code, block S205 may be performed; otherwise block S210 may be performed.

In this block, the positioning images taken as the key characteristics of the image may be compared with the positioning images of various two-dimension codes. If the positioning images of the image are the positioning images of the two-dimension code, it may be determined that the image includes the characteristics of the two-dimension code and the image may be the two-dimension code or the image including the two-dimension code, and block S205 may be performed. If the positioning images of the image are not the positioning images of any two-dimension code, it may be determined that the image does not include the two-dimension code and block S210 may be performed.

In block S205, the key characteristics of the image may be determined as those of the two-dimension code. In this block, it may be determined that the key characteristics of the image may be the characteristics of the two-dimension code. That is, it may be determined that the image may be the two-dimension code or the image including the two-dimension code.

In block S206, an image processing menu may be output to make a response to the processing instruction.

The image processing menu may include a two-dimension reading option.

Since the image may include the characteristics of the two-dimension code, the parsing of the image may include parsing the two-dimension code in the image. In order to make a response to the processing instruction of the user, the image processing menu may be output in this block. Image interaction menu including a link copying option, an image saving option and an image sharing option may be set in the picture processing menu. The two-dimension reading option may also be set in the image processing menu, so that the user may choose to parse the two-dimension code in the image.

In block S207, when the two-dimension reading option is selected, the area of the two-dimension code in the image may be positioned according to the position of the positioning images in the Grayscale image.

When the two-dimension reading option is selected, the two-dimension code in the image may be parsed according to the two-dimension reading option. The area of the two-dimension code may be determined according to the positioning images of the image. The area of the two-dimension code in the image may be positioned according to the position of the positioning images in the Grayscale image.

In block S208, the area of the two-dimension code may be read. The obtained two-dimension code may be parsed and content information of the two-dimension code may be obtained.

The area of the two-dimension code may be read and a complete two-dimension code may be obtained. The decoding process may include performing grid sample on the two-dimension code, sampling a pixel on each point of intersection of the grid and determining dark areas and light areas according to a threshold value and constructing a bitmap. The number "1" in the binary may denote a dark pixel and "0" may denote a light pixel. Therefore, original binary sequence value of the two-dimension code may be obtained and error correction and decoding may be performed on data in the original binary sequence. The data bit stream may be converted into digital code words according to a logical coding rule of the two-dimension code and the content information stored in the two-dimension code may be restored.

In block S209, the content information of the image may be output. In this block, the content information obtained by parsing the image may be displayed, so that the user may view the content information stored in the two-dimension code and may further copy and share the content information, etc.

In block S210, the image interaction menu may be output to make a response to the processing instruction.

Since it may be determined that the positioning images of the images may not be any of the positioning images of the two-dimension codes in block S204, in order to make a response to the processing instruction of the user, the image interaction menu may be output in this block. The image interaction menu may include image interaction options, such as a link copying option, an image saving option and an image sharing option. However, the two-dimension code reading option may not be set in the image interaction menu or the two-dimension code reading option may be set as an "unselectable" status, which is convenient for the operation of the user.

The above method for parsing the image may be described hereinafter in detail accompanying with FIG. 3.

Figure 3A:
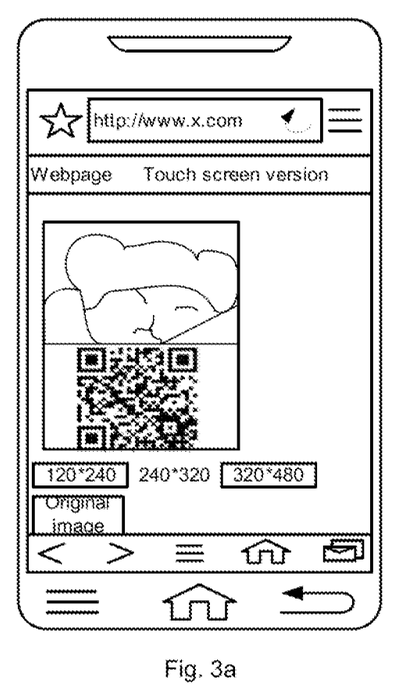
FIG. 3a is a schematic diagram illustrating a scheme for parsing an image in accordance with an example of the present disclosure.

Referring FIG. 3a, FIG. 3a is a schematic diagram illustrating a scheme for parsing an image in accordance with an example of the present disclosure. In FIG. 3a, the user may view an image on a webpage on a mobile phone. The image may include a pattern similar to the two-dimension code. If the user may press and hold the image to send the processing instruction, the mobile phone may convert the image into the Grayscale image, detect the Grayscale image, identify the positioning images of the Grayscale image and take the positioning images of the Grayscale image as the key characteristics.

Figure 3B:
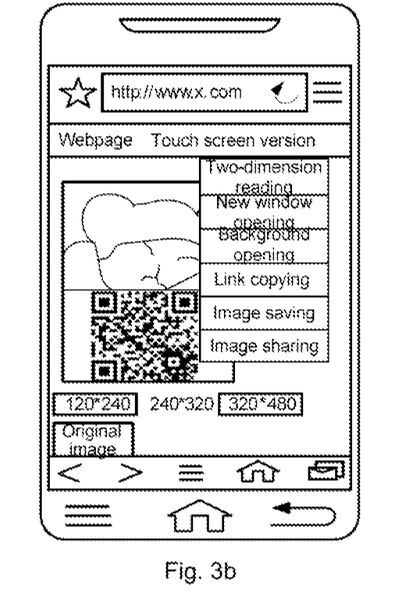
FIG. 3b is a schematic diagram illustrating another scheme for parsing an image in accordance with an example of the present disclosure.

Referring to FIG. 3b, FIG. 3b is a schematic diagram illustrating another scheme for parsing an image in accordance with an example of the present disclosure. The mobile phone may determine whether the positioning images taken as the key characteristics of the image are the positioning images of the two-dimension code. If the positioning images taken as the key characteristics of the image are the positioning images of the two-dimension code, the mobile phone may determine that the image may include the two-dimension code and output the image processing menu shown in FIG. 3b to make a response to the processing instruction of the user. As shown in FIG. 3b, the image processing menu may include a two-dimension reading option. If the user selects the two-dimension reading option in the image processing menu, the mobile phone may position the area of the two-dimension in the image according to the positioning images, read the area of the two-dimension code and decode the two-dimension code to obtain the content information stored in the two-dimension code in the image.

Figure 3C:
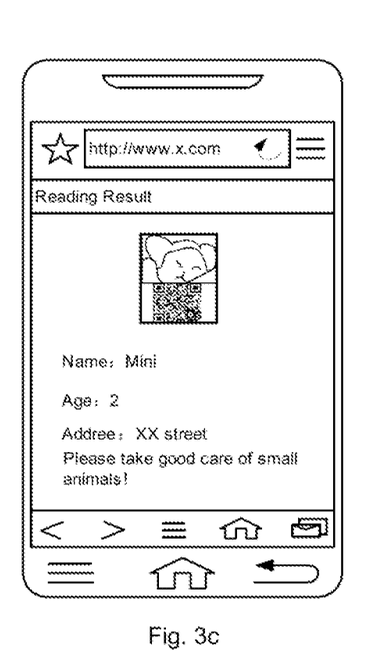
FIG. 3c is a schematic diagram illustrating another scheme for parsing an image in accordance with an example of the present disclosure.

Referring FIG. 3c, FIG. 3c is a schematic diagram illustrating another scheme for parsing an image in accordance with an example of the present disclosure. The mobile phone may parse the two-dimension code in the image. After the mobile phone obtain the content information of the image, as shown in FIG. 3c, the content information may be displayed on the screen of the mobile phone, so that the user may view the content information stored in the two-dimension code, copy and share the content information, etc.

Figure 3D:
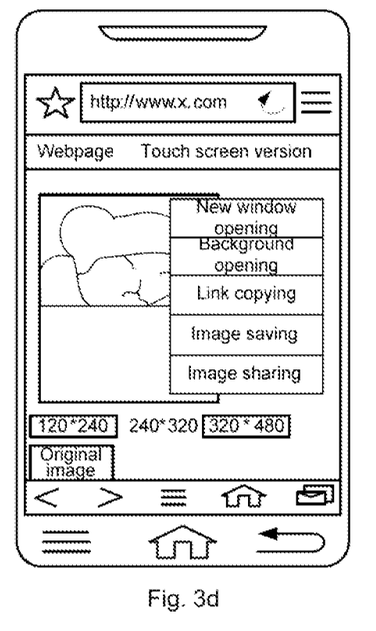
FIG. 3d is a schematic diagram illustrating another scheme for parsing an image in accordance with an example of the present disclosure.

Referring to FIG. 3d, FIG. 3d is a schematic diagram illustrating another scheme for parsing an image in accordance with an example of the present disclosure. The mobile phone may determine whether the positioning images taken as the key characteristics are the positioning images of the two-dimension code. If the positioning images taken as the key characteristics are the positioning images of the two-dimension code, the image on the mobile phone may not include the two-dimension code. In order to make a response to the processing instruction of the user, an image interaction menu may be displayed on the mobile phone. The image interaction menu may include image interaction options, such as a link copying option, an image saving option and an image sharing option. However, the two-dimension code reading option may not be set in the image interaction menu, which is convenient for the operation of the user.

With the method examples performed above, this example of the present disclosure may parse the image on this end (i.e. the image on the device performing the parsing process) without other devices, which may enhance the parsing efficiency. Before the image is parsed, this example of the present disclosure may first determine whether the image includes the two-dimension code and parses the image with the two-dimension decoding mode if it may be determined that the image includes the two-dimension code, which may reduce unnecessary processes, enhance the parsing efficiency and save the resources.

Referring to FIGS. 4 to 9, the device for parsing an image provided by examples of the present disclosure may be described hereinafter in detail. It should be noted that the device mentioned hereinafter may be applied to the above method examples to execute the above method for parsing the image.

Figure 4:
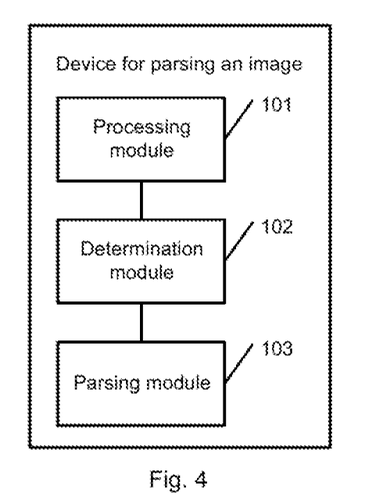
FIG. 4 is a schematic diagram illustrating a device for parsing an image in accordance with an example of the present disclosure.

Referring to FIG. 4, FIG. 4 is a schematic diagram illustrating a device for parsing an image in accordance with an example of the present disclosure. The device may include a processing module 101 and a parsing module 103. According to an example of the present disclosure, the device may further include a determination module 102

The processing module 101 may be to process an image on this device and obtain key characteristics of the image.

This end may refer to the device for parsing the image in this example. The image may include an image on a current webpage on the device, an image stored in the device or an image in a file displayed on the device. For the convenience of parsing the image, the processing module 101 may be further to perform binary processing on the image, convert the image into the Grayscale image and extract the key characteristics.

The parsing module 103 may be to parse the image with a two-dimension decoding mode and obtain content information of the image.

According to an example of the present disclosure, the determination module 102 may be further included. The determination module 102 may be to determine whether the key characteristic of the image are characteristic of the two-dimension code.

The two-dimension may include positioning images. The positioning images may be foundation of identification of the two-dimension code. An area of the two-dimension code may be determined according to the positioning images. In this example, the positioning images of the two-dimension may be taken as significant character points of the two-dimension code. The extracted key characteristics of the image may be compared with those of the two-dimension code. If the key characteristics of the image are determined as the characteristics of the two-dimension code, the image may include the two-dimension code. If the key characteristics of the image are not the characteristics of the two-dimension code, the image may not include the two-dimension code. The determination module 102 may determine whether the image is the two-dimension code before parsing the image, which may reduce unnecessary parsing process and save the resources.

The parsing module 103 may be further to parse the image with the two-dimension decoding mode if the key characteristics of the image are the characteristics of the two-dimension code.

If the key characteristics of the image are the characteristics of the two-dimension code, it may show that the image may be the two-dimension code or an image including the two-dimension code. The two-dimension code in the image may be read, the two-dimension code may be parsed, the content information stored in the two-dimension code may be obtained and the content information in the image may be obtained.

With the above device, this example of the present disclosure may parse the image on this end (i.e. the image on the device performing the parsing process) without other devices, which may enhance the parsing efficiency. Before the image is parsed, this example of the present disclosure may first determine whether the image includes the two-dimension code and parses the image with the two-dimension decoding mode if it may be determined that the image includes the two-dimension code, which may reduce unnecessary processes, enhance the parsing efficiency and save the resources.

Figure 5:
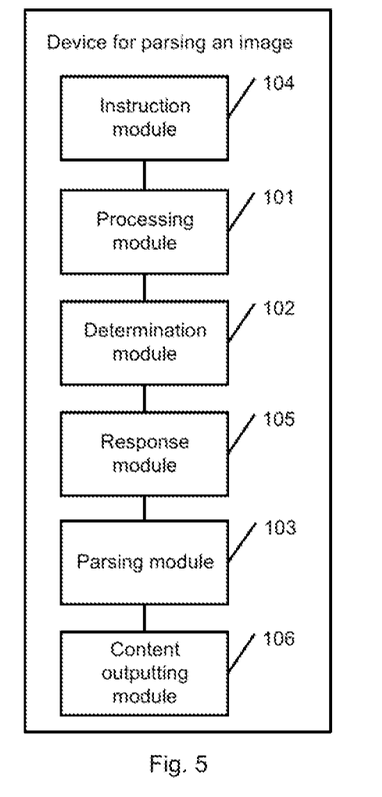
FIG. 5 is a schematic diagram illustrating a processing module in accordance with an example of the present disclosure.

Referring to FIG. 5, FIG. 5 is a schematic diagram illustrating another device for parsing an image in accordance with an example of the present disclosure. The device may include a processing module 101, a determination module 102, a parsing module 103, an instruction module 104, a response module 105 and a content outputting module 106. The structure of the processing module 101, determination module 102 and parsing module 103 may be referred to the description of FIG. 4, which may not be repeated here.

The instruction module 104 may be to receive a processing instruction of the image, instruct the processing module 101 to process the image on the device and obtain the key characteristics of the image.

The processing instruction may include: an instruction generated by clicking on the image, an instruction generated by pressing the image exceeding a preset length of time or an instruction generated by a selection menu.

The response module 105 may be to output an image processing menu, which may include a two-dimension code reading option, to make a response to the processing instruction when the key characteristics of the image are determined as the characteristics of the two-dimension code, instruct the parsing module 103 to parse the image with the two-dimension decoding mode when the two-dimension code reading option is selected and obtain the content information in the image.

The image processing menu output by the response module 105 may include a two-dimension reading option except for the image interaction menu including a link copying option, an image saving option and an image sharing option, so that the user may parse the two-dimension code in the image. It should be noted when determining that the key characteristics of the image are not the characteristics of the two-dimension code, in order to make a response to the processing instruction of the user, the response module 105 may further output the image interaction menu. The image processing menu output by the response module 105 may include the image interaction menu including the link copying option, the image saving option and the image sharing option. However, the two-dimension code reading option may not be set, or the two-dimension code reading option may be set as an "un-selectable" status for the convenience of the operation of the user.

The content outputting module 106 may be to output the content information of the image.

The content outputting module 106 may display the content information of the image, so that the user may view the content information stored in the two-dimension code, copy and share the content information, etc.

With the above device, this example of the present disclosure may parse the image on this end (i.e. the image on the device performing the parsing process) without other devices, which may enhance the parsing efficiency. Before the image is parsed, this example of the present disclosure may first determine whether the image includes the two-dimension code and parses the image with the two-dimension decoding mode if it may be determined that the image includes the two-dimension code, which may reduce unnecessary processes, enhance the parsing efficiency and save the resources.

Each module in the device for parsing the image in the examples of the present disclosure may be described hereinafter in detail.

Figure 6:
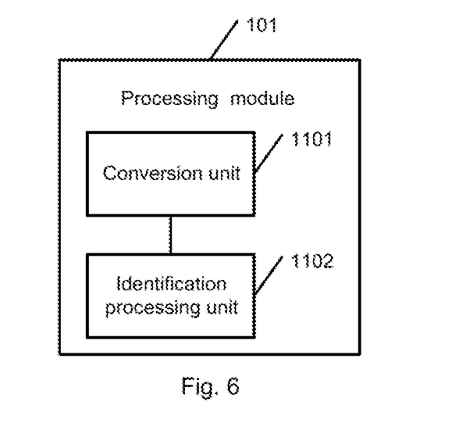
FIG. 6 is a schematic diagram illustrating a conversion unit in accordance with an example of the present disclosure.

Referring to FIG. 6, FIG. 6 is a schematic diagram illustrating the processing module 101 in accordance with an example of the present disclosure. The processing module 101 may include a conversion unit 1101 and an identification processing unit 1102.

The conversion unit 1101 may be to convert the image on the device into the Grayscale image.

The conversion unit 1101 may be further to convert the image into the Grayscale image, perform the binary processing on the image and store the pixels of the image in the binary array.

Figure 7:
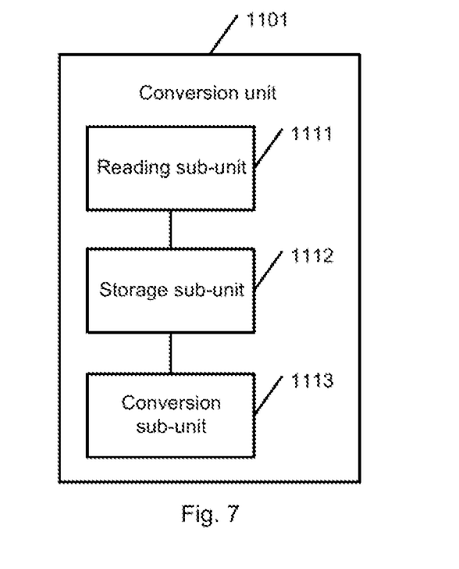
FIG. 7 is a schematic diagram illustrating a determination module in accordance with an example of the present disclosure.

Referring to FIG. 7, FIG. 7 is a schematic diagram illustrating the conversion unit 1101 in accordance with an example of the present disclosure. The conversion unit 1101 may include a reading sub-unit 1111, a storage sub-unit 1112 and conversion sub-unit 1113.

The reading sub-unit 1111 may be to read the Red Green Blue (RGB) values of pixels of the image.

The storage sub-unit 1112 may be to store the RGB values of the pixels of the image in a binary array.

The conversion sub-unit 1113 may be to convert the RGB values in the binary array into YUV values with a YUV algorithm.

The identification processing unit 1102 may be to detect the Grayscale image, identify the positioning images of the Grayscale image and taking positioning images of the Grayscale image as the key characteristics of the image.

According to the detection method of the two-dimension code, the identification processing unit 1102 may detect the Grayscale image obtained by converting the image, identify the positioning images of the Grayscale image and take the positioning images of the Grayscale image as the key characteristics of the image.

Figure 8:
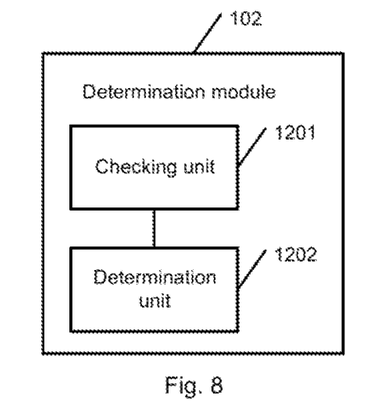
FIG. 8 is a schematic diagram illustrating another device for parsing an image in accordance with an example of the present disclosure.

Referring to FIG. 8, FIG. 8 is a schematic diagram illustrating a determination module 102 in accordance with an example of the present disclosure. The determination module 102 may include a checking unit 1201 and a determination unit 1202.

The checking unit 1201 may be to determine whether the positioning images of the Grayscale image are positioning images of the two-dimension code.

The determination unit 1202 may be to compare the positioning images of the Grayscale image taken as the key characteristics of the image with the positioning images of various two-dimension codes and determine that the image include the characteristics of the two-dimension code if the positioning images of the Grayscale image are the positioning image of the two-dimension code. The image may be the two-dimension code or an image including the two-dimension code. The determination unit 1202 may be further to determine that the image may not include the two-dimension code if the positioning images of the image are not the positioning images of any two-dimension code.

The determination unit 1202 may be further to determine that the key characteristics of the image are the characteristics of the two-dimension code if the positioning images of the Grayscale image are the positioning images of the two-dimension code. That is, the determination unit 1202 may determine that the image may be the two-dimension code or an image including the two-dimension code.

Figure 9:
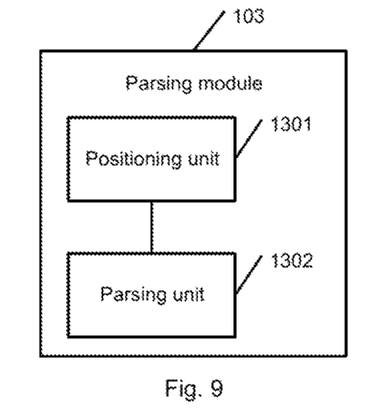
FIG. 9 is a schematic diagram illustrating a parsing module in accordance with an example of the present disclosure.

Referring to FIG. 9, FIG. 9 is a schematic diagram illustrating the parsing module 103 in accordance with an example of the present disclosure. The parsing module 103 may include a positioning unit 1301 and a parsing unit 1302.

The positioning unit 1301 may be to position an area of the two-dimension code in the image according to the positioning images of the Grayscale image The parsing unit 1302 may be to read the area of the two-dimension code, decode the obtained two-dimension code and obtain the content information. The parsing unit 1302 may read the area of the two-dimension code and obtain the complete two-dimension code. The process for decoding the two-dimension code may be shown in relevant descriptions of block S208 in the example of FIG. 2, which may not be repeated here.

With the above device, this example of the present disclosure may parse the image on this end (i.e. the image on the device performing the parsing process) without other devices, which may enhance the parsing efficiency. Before the image is parsed, this example of the present disclosure may first determine whether the image includes the two-dimension code and parses the image with the two-dimension decoding mode if it may be determined that the image includes the two-dimension code, which may reduce unnecessary processes, enhance the parsing efficiency and save the resources.

Figure 10:
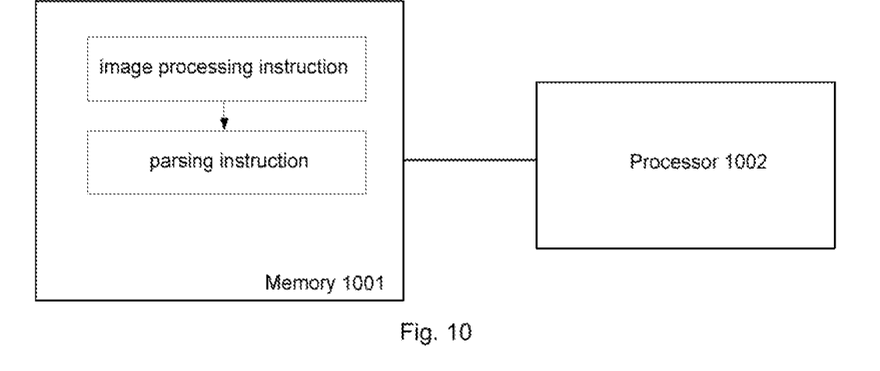
FIG. 10 is a schematic diagram illustrating another device for parsing an image in accordance with an example of the present disclosure.

Referring to FIG. 10, FIG. 10 is a schematic diagram illustrating another device for parsing an image in accordance with an example of the present disclosure.

The device may include a memory 1001 and a processor 1002.

The memory 1001 may store an image processing instruction and a parsing instruction.

The processor 1002 may communicate with the memory 1001 and execute the image processing instruction and the parsing instruction to respectively perform the operations of the processing module 101 and the parsing module 103.

The memory 1001 may further store a determination instruction, an instruction processing instruction, a response instruction and a content outputting instruction. The processor 1002 may further execute the determination instruction, the instruction processing instruction, the response instruction and the content outputting instruction the respectively perform the operations of the determination module 102, the instruction module 104, the response module 105 and the content outputting module 106.

According to an example, the image processing instruction may include a conversion instruction and an identification processing instruction. The processor 1002 may further execute the conversion instruction and the identification processing instruction to respectively perform the operations of the conversion unit 1101 and the identification processing unit 1102.

According to an example, the conversion instruction may include a reading sub-instruction, a storage sub-instruction and a conversion sub-instruction. The processor 1002 may further execute the reading sub-instruction, the storage sub-instruction and the conversion sub-instruction to respectively execute the operations of the reading sub-unit 1111, the storage sub-unit 1112 and the conversion sub-unit 1113.

According to an example, the determination instruction may further include a checking instruction and a determination sub-instruction. The processor 1002 may further execute the checking instruction and the determination sub-instruction to respectively perform the operations of the checking unit 1201 and the determination unit 1202.

According to an example, the parsing instruction may further include a positioning instruction and a parsing sub-instruction. The processor may further execute the positioning instruction and the parsing sub-instruction to respectively perform the operations of the positioning unit 1301 and the parsing unit 1302.

It should be noted that the structure and function of the device for parsing the image may be implemented with the examples of the present disclosure. The process for implementing the device may be shown in the method examples, which may not be repeated here.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method for parsing an image, comprising:
   processing, by a device, an image on the device;
   obtaining, by the device, key characteristics of the image;
   parsing, by the device, the image with a two-dimension decoding mode; and
   obtaining, by the device, content information of the image;
   wherein processing, by the device, the image on the device and obtaining, by the device, the key characteristics of the image comprises:
   converting, by the device, the image on the device into a Grayscale image;
   detecting, by the device, the Grayscale image;
   identifying, by the device, positioning images of the Grayscale image; and
   taking, by the device, the positioning images of the Grayscale as the key characteristics of the image.

2. The method according to claim 1, further comprising:
   determining, by the device, whether the key characteristics of the image are characteristics of a two-dimension code;
   wherein parsing, by the device, the image with the two-dimension decoding mode comprises:
   parsing, by the device, the image with the two-dimension decoding mode if the key characteristics of the image are the characteristics of the two-dimension code.

3. The method according to claim 2, wherein converting, by the device, the image on the device into the Grayscale image comprises:
   reading, by the device, Red Green Blue (RGB) values of pixels of the image;
   saving, by the device, the RGB values of the pixels of the image in a binary array; and
   converting, by the device, the RGB values in the binary array into YUV values with a YUV algorithm.

4. The method according to claim 3, wherein determining whether the key characteristics of the image are the characteristics of the two-dimension code comprises:
   determining whether the positioning images of the Grayscale image are positioning images of the two-dimension code;
   determining that the key characteristics of the image are the characteristics of the two-dimension code if the positioning images of the Grayscale image are the positioning images of the two-dimension code; wherein
   the two-dimension code comprises: a Multi-row two-dimension code or a matrix two-dimension code.

5. The method according to claim 4, wherein before processing, by the device, the image on the device and obtaining the key characteristics of the image, the method further comprises:
   receiving a processing instruction of the image; wherein the processing instruction comprises: an instruction generated by clicking on the image, an instruction generated by pressing the image exceeding a preset length of time or an instruction generated by a selection menu;
   wherein if the key characteristics of the image are the characteristics of the two-dimension code, before parsing the image with the two-dimension decoding mode and obtaining the content information of the image, the method further comprises:
   outputting an image processing menu to make a response to the processing instruction; wherein the image processing menu comprises a two-dimension reading option;

wherein parsing the image with the two-dimension decoding mode and obtaining the content information of the image comprises:
parsing the image with the two-dimension decoding mode and obtaining the content information of the image if the two-dimension reading option is selected.

6. The method according to claim 5, wherein parsing the image with the two-dimension decoding mode and obtaining the content information of the image comprises:
positioning an area of the two-dimension code in the image according to position of the positioning images of the Grayscale image;
reading the area of the two-dimension code;
decoding the read two-dimension code; and
obtaining the content information of the image.

7. The method according to claim 1, wherein after obtaining the content information of the image, the method further comprises:
outputting the content information of the image; wherein the image comprises: an image on a webpage on the device, an image stored in the device or an image in a file displayed on the device.

8. A device for parsing an image, comprising:
a processing module, to process an image on the device and obtain key characteristics of the image; and
a parsing module, to parse the image with a two-dimension decoding mode and obtain content information of the image;
wherein the processing module comprises:
a conversion unit, to convert the image on the device into a Grayscale image; and
an identification processing unit, to detect the Grayscale image, identify positioning images of the Grayscale image and take the positioning images of the Grayscale image as the key characteristics of the image.

9. The device according to claim 8, further comprising:
a determination module, to determine whether the key characteristic of the image are characteristics of a two-dimension code; wherein
the parsing module is further to parse the image with the two-dimension decoding mode and obtain the content information of the image if the key characteristics of the image are the characteristics of the two-dimension code.

10. The device according to claim 9, wherein the conversion unit comprises:
a reading sub-unit, to read Red Green Blue (RGB) values of pixels of the image;
a storage sub-unit, to store the RGB values of the pixels of the image in a binary array; and
a conversion sub-unit, to convert the RGB values in the binary array into YUV values with a YUV algorithm.

11. The device according to claim 10, wherein the determination module comprises:
a checking unit, to determine whether the positioning images of the Grayscale image are positioning images of the two-dimension code;
a determination unit, to determine that the key characteristics of the image are the characteristics of the two-dimension code if the positioning images of the Grayscale image are the positioning image of the two-dimension code;
wherein the two-dimension code comprises: a Multi-row two-dimension code or a matrix two-dimension code.

12. The device according to claim 11, further comprising:
an instruction module, to receive a processing instruction of the image, instruct the processing module to process the image on the device and obtain the key characteristics of the image; wherein the processing instruction comprises: an instruction generated by clicking on the image, an instruction generated by pressing the image exceeding a preset length of time or an instruction generated by a selection menu;
a response module, to output an image processing menu to make a response to the processing instruction if the key characteristics of the image are the characteristics of the two-dimension code; wherein the image processing menu comprises a two-dimension reading option;
the response module is further to instruct the parsing module to parse the image with the two-dimension decoding mode and obtain the content information of the image if the two-dimension reading option is selected.

13. The device according to claim 12, wherein the parsing module comprises:
a positioning unit, to position an area of the two-dimension code in the image according to the positioning images of the Grayscale image; and
a parsing unit, to read the area of the two-dimension code and decode the read two-dimension code and obtain the content information.

14. The device according to claim 8, further comprising:
a content outputting module, to output the content information of the image; wherein
the image comprises: an image on a webpage on the device, an image stored in the device or an image in a file displayed on the device.

15. A non-transitory computer-readable medium storing instructions which, when executed by one or more processors, cause a device to perform a method for parsing an image, comprising:
converting, by a device, an image on the device into a Grayscale image;
detecting, by the device, the Grayscale image;
identifying, by the device, positioning images of the Grayscale image; and
taking, by the device, the positioning images of the Grayscale as key characteristics of the image;
parsing, by the device, the image with a two-dimension decoding mode; and
obtaining, by the device, content information of the image.

* * * * *